United States Patent
Wu et al.

(10) Patent No.: US 12,099,040 B1
(45) Date of Patent: Sep. 24, 2024

(54) METHOD FOR TESTING NANOMECHANICAL PROPERTIES OF NATURAL GAS HYDRATE SAMPLES

(71) Applicants: Qingdao Institute of Marine Geology, Qingdao (CN); Qingdao Marine Science and Technology Center, Qingdao (CN)

(72) Inventors: Nengyou Wu, Qingdao (CN); Yanlong Li, Qingdao (CN); Yunkai Ji, Qingdao (CN); Minhui Qi, Qingdao (CN); Qiang Chen, Qingdao (CN)

(73) Assignees: Qingdao Institute of Marine Geology, Qingdao (CN); Qingdao Marine Science and Technology Center, Qingdao (CN)

( * ) Notice: Subject to any disclaimer, the term of this patent is extended or adjusted under 35 U.S.C. 154(b) by 0 days.

(21) Appl. No.: 18/621,107

(22) Filed: Mar. 29, 2024

(30) Foreign Application Priority Data

Aug. 4, 2023 (CN) .......................... 202310978359.5

(51) Int. Cl.
*G01N 3/54* (2006.01)
*G01N 1/28* (2006.01)
*G01N 1/42* (2006.01)

(52) U.S. Cl.
CPC ............... *G01N 3/54* (2013.01); *G01N 1/286* (2013.01); *G01N 1/42* (2013.01); *G01N 2001/2873* (2013.01)

(58) Field of Classification Search
CPC ............ G01N 3/54; G01N 1/286; G01N 1/42; G01N 2001/2873
See application file for complete search history.

(56) References Cited

U.S. PATENT DOCUMENTS

| 9,766,170 | B2 * | 9/2017 | Dubois | .................... G01N 3/42 |
| 11,231,349 | B1 * | 1/2022 | Du | ........................... G01N 1/32 |

FOREIGN PATENT DOCUMENTS

CN 117030430 A * 11/2023

* cited by examiner

*Primary Examiner* — Octavia Hollington
(74) *Attorney, Agent, or Firm* — Bayramoglu Law Offices LLC

(57) ABSTRACT

A method for testing the nanomechanical properties of natural gas hydrate samples is provided. A dry pure nitrogen environment and a partial ultralow-temperature liquid nitrogen test condition are constructed, a micro-positive pressure state in a glovebox is maintained, and the temperature of a milling tool and a sample stand are maintained consistent; then, a hydrate sample is transferred and installed in the dry nitrogen environment, and the milling tool is driven to cut a surface of the natural gas hydrate sample to form a relatively flat surface; next, indentation parameter reliability testing is performed, an indentation load is changed, indentation testing of indentation points is performed, and an indentation form is observed. The method can realize indentation testing of natural gas hydrate samples in an ultralow-temperature and dry environment by means of a nanoindenter.

7 Claims, 2 Drawing Sheets

METHOD FOR TESTING NANOMECHANICAL PROPERTIES OF NATURAL GAS HYDRATE SAMPLES

CROSS-REFERENCE TO THE RELATED APPLICATION

This application is based upon and claims priority to Chinese Patent Application No. 202310978359.5 filed on Aug. 4, 2023, the entire content of which is incorporated herein by reference.

TECHNICAL FIELD

The invention belongs to the technical field of microscopic testing of hydrates, and particularly relates to a method for testing nanomechanical properties of natural gas hydrate samples, which measures mechanical properties of natural gas hydrates in an ultralow-temperature environment by means of a nanoindenter.

BACKGROUND

Natural gas hydrates are clathrate polycrystalline solids formed by bonding of water molecules and natural gas molecules under a low-temperature and high-pressure condition, and the mechanical properties and deformation behaviors of the natural gas hydrates are the basis for evaluating the overall deformation failure behavior of marine hydrate-bearing reservoirs. At present, the mechanical properties of the natural gas hydrates are explored mainly in the macroscope testing field, such as triaxial testing and direct-shear testing. There are relatively rare techniques that can be directly used for testing the mechanical properties of natural gas hydrate samples in the microscopic field. Particularly, there is a lack of test techniques for testing the mechanical properties of natural gas hydrate at the nanoscale, and microscopic numerical simulation (such as molecular dynamics simulation) results cannot be experimentally verified, leading to a severe disjunction between numerical simulation and experimental simulation. Therefore, it is of practical significance to characterize the mechanical properties of natural gas hydrates at a microscopic (nano) scale.

The nanoindentation technique is a microscopic test technique originated in the field of material science and has been used to some extent in characterizing and representing the mechanical properties of aeronautical material and biological materials. Because natural gas hydrates, as substances prone to phase changes, are extremely easy to decompose under a normal temperature and pressure condition and cannot be measured stably, natural gas hydrate samples must be preserved, transferred and tested in an ultralow-temperature condition due to the limitations of the low-temperature and high-pressure condition, phase changes and other features of hydrates, there is a technical blank in testing the nanomechanical properties of hydrates, and existing nanoindentation test techniques cannot satisfy the requirements for testing the mechanical properties of natural gas hydrates.

SUMMARY

In view of the technical blank in nanoindentation testing of the mechanical properties of natural gas hydrates in the prior art, the invention provides a method for testing nanomechanical properties of natural gas hydrates, which realizes micro-nano measurement of natural gas hydrate samples in an ultralow-temperature environment by means of a nanoindenter.

The invention is implemented by the following technical solution: a method for testing nanomechanical properties of natural gas hydrate samples realizes micro-nano measurement of a natural gas hydrate sample in an ultralow-temperature environment by means of a nanoindentation system, the nanoindentation system comprises a glovebox and a sample stand, a microscope system, a nano positioning stage, a micro-nano test module and a control cabinet which are mounted in the glovebox, a milling tool which is in close contact with the sample stand and used for cutting a surface of the sample is arranged on a side of the sample stand, and the nano positioning stage drives the micro-nano test module to perform indentation on the hydrate sample on said side of the sample stand; the micro-nano test module records displacement and force when a nano probe is indented into the hydrate sample and transmitting the displacement and force to the control cabinet in real time; the method for testing nanomechanical properties of natural gas hydrate samples comprises:

Step A, constructing a dry pure nitrogen environment and a partial ultralow-temperature liquid nitrogen test condition:

placing a liquid nitrogen tank containing the natural gas hydrate sample in the glovebox in advance, constructing a pure nitrogen test environment, for transferring the hydrate sample, in the glovebox, and maintaining a micro-positive pressure state in the glovebox; then, injecting liquid nitrogen into the sample stand to cool the sample stand and the milling tool, and when temperatures of the sample stand and the milling tool reach a set temperature, starting a heating system at a bottom of the sample stand to maintain the temperatures of the sample stand and the milling tool at the set temperature;

Step B, in the dry nitrogen environment, transferring and installing the hydrate sample on the sample stand, and driving the milling tool to cut the surface of the natural gas hydrate sample to form a flat surface on an upper surface of the natural gas hydrate sample, wherein during the cutting process, the surface of the hydrate sample is repeatedly scraped by a thickness not greater than a thickness of the milling tool each time;

Step C, performing an indentation test:

Step (1), indentation parameter reliability testing: selecting on the surface of the hydrate sample an initial indentation point for indenting the nano probe, indenting the nano probe into the hydrate sample at a fixed set load, recording in real time an indentation amount and the load during the indentation process of the nano probe, and plotting a displacement-load curve; withdrawing the nano probe, and recording a displacement-load curve during the withdrawing process; sequentially testing all initial indentation points in this way, plotting all displacement-load curves in a same coordinate system; if the displacement-load curves of all the initial indentation points have a high degree of overlap, indicating that homogeneity of the hydrate sample and stability of the nano probe are optimal and an indentation test result is reliable, wherein the initial indentation points are uniformly distributed on a circle taking a center of the flat surface of the hydrate sample as a center and having a radius being 100 times a diameter of the nano probe, and the number of the initial indentation points is 3-5;

Step (2), indentation testing: changing the indentation load and the indentation point to obtain a variation pattern of a nanoindentation curve of the same hydrate sample with the indentation load under a same temperature condition to analyze residual strength and other characteristic parameters of the natural gas hydrate sample under different loading conditions;

Step (3), temperature sensitivity testing: changing the hydrate sample according to Step B, changing the temperature of the sample stand, and repeating Step (1) and Step (2) to obtain nanoindentation response characteristics of the hydrate sample under different temperature conditions; and Step (4), when Step (2) and Step (3) are performed, observing, by means of the microscope system, a failure form of the surface of the natural gas hydrate sample during the indentation process of the nano probe and a residual indentation form of the surface of the sample after the nano probe is withdrawn, and comparing results recorded under different indentation conditions with nanoindentation response characteristics of the hydrate sample under different indentation conditions to analyze indentation response characteristics of the natural gas hydrate sample; and Step D, after the indentation test is completed, slowly releasing the positive pressure in the glovebox, operating the micro-nano test module to return and clean the nano probe, and after the entire nanoindentation system is dried, taking out the liquid nitrogen tank containing the hydrate sample, and maintaining the low-temperature glovebox in a dry nitrogen-rich environment.

Further, in Step C, during indentation testing, the indentation load is set according to actual test requirements basically by way of sequentially increasing or decreasing, in the form of an arithmetic progression, the load that is set during indentation parameter reliability testing, selected indentation points are located on a circle having a same center as a circle where the initial indentation points are located and a radius being 40-60 times a diameter of the nano probe, test points are uniformly distributed on a selected circle, and the number of the test points is 3-5.

Further, Step A, during the construction of the pure nitrogen environment, nitrogen is quickly injected from one side of the glovebox, air is discharged from the other side of the glovebox, and a gas flow in the glovebox is sufficiently stirred when the nitrogen is injected into the glovebox; the nitrogen is continuously injected into the glovebox and is released quickly when the nitrogen in the glovebox reaches a micro-positive pressure and the operation is repeated at least twice to quickly release and clean air and moisture in the glovebox to guarantee the pure nitrogen environment, and the micro-positive pressure state in the glove box is maintained during the whole indentation test.

Further, the sample stand comprises a sample cell mounting chamber and a liquid nitrogen containing chamber, the sample cell mounting chamber and the liquid nitrogen containing chamber are isolated by means of a heat insulation plate and connected by means of a heat-conduction copper sheet, and a heating module is arranged at a bottom of the sample cell mounting chamber; in Step A, during construction of a partial ultralow-temperature environment, liquid nitrogen is injected into the liquid nitrogen containing chamber of the sample stand in the glovebox to cool the sample stand and the milling tool partially, the sample stand is maintained at the set temperature by means of the heating module; and when the temperature of the sample stand remains stable under the combined action of the heating module at the bottom of the sample cell mounting chamber and liquid nitrogen cooling, the sample is transferred and installed.

Compared with the prior art, the invention has the following advantages and beneficial effects:

According to the nano mechanical testing method provided by the invention, through testing and calibration of the initial indentation points of the sample and the cooperation of the indentation points for testing, minor errors that may be caused by manual operation during the single-point indentation process are avoided, the problem that no technical method for nanoindentation testing in the field of natural gas hydrates is available at present is effectively solved, and important technical support is provided for effectively obtaining the mechanical properties and deformation behaviors of natural gas hydrates at the nanoscale; and when used together with a nanoindenter, the method is expected to improve the mechanical testing accuracy of the natural gas hydrates by three orders of magnitude, thus having high application and promotion value.

DETAILED DESCRIPTION OF THE EMBODIMENTS

To gain a better understanding of the objective, features and advantages of the invention, the invention will be further described below in conjunction with accompanying drawings and embodiments. Many specific details are expounded in the following description to provide a sufficient understanding of the invention. However, the invention can also be implemented in other ways different from those described here. Therefore, the invention is not limited to the specific embodiments disclosed below.

Figure 2:
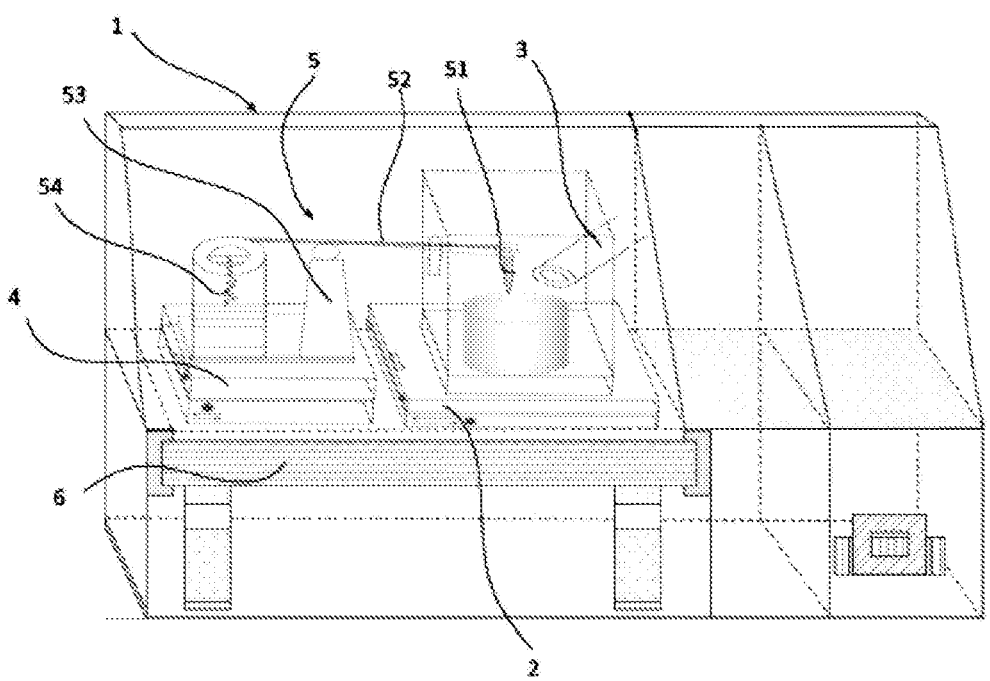
FIG. 2 is a schematic structural diagram of a nanoindenter according to one embodiment of the invention.

Considering that natural gas hydrates are prone to phase changes and decomposition, the invention provides a solution that can realize indentation testing of a natural gas hydrate sample in an ultralow-temperature and dry environment by means of a nanoindenter which can be placed in an ultralow-temperature environment. As shown in FIG. 2 which illustrates the structure of the nanoindenter, the nanoindenter comprises a glovebox 1, a sample stand 2, a microscope system 3, a nano positioning stage 4, a micro-nano test module 5, an anti-vibration platform 6, a control mechanism and accessories, wherein a milling tool used for cutting a surface of the sample is arranged on one side of the sample stand 2, the sample stand 2 is in close contact with the milling tool, a fan is also arranged in the glovebox 1, and the sample stand 2, the nano positioning stage 4, the micro-nano test module 5 and the microscope system 3 are all mounted on the anti-vibration platform 6; the nano positioning stage 4 and the sample stand 2 are mounted in parallel, and the nano positioning stage 4 drives the micro-nano test module to perform indentation on the sample on the sample stand 2; the micro-nano test module 5 records the displacement and force when performing indentation on the sample, and transmits the displacement and force to the control cabinet in real time; and the microscope system 3 is obliquely mounted above the sample stand 2 and inclines by a certain angle with respect to an indentation point of an indentation head of the micro-nano test module 5 to avoid interference between an optical microscope and a nano probe, thus assisting in locating the indentation point and observing in real time a morphology change of the sample when the probe is indented into the sample. The nano positioning stage 4 drives the micro-nano test module 5 to perform indentation on the hydrate sample on the sample stand 2, and a morphology change of the hydrate sample is observed by means of the microscope system 3 when the micro-nano test module 5 performs indentation on the hydrate sample.

Referring to FIG. 2 again, the micro-nano test module 5 comprises a piezoelectric actuator 54, a support lever 53, a torque lever 52 and a nano probe 51, two ends of the torque lever 52 are connected to the piezoelectric actuator 54 and the nano probe 51 respectively, the support lever 53 and the piezoelectric actuator 54 are both mounted on the nano positioning stage 4, and the piezoelectric actuator 54 is mainly used for driving one end of the torque lever 52 to move upwards and downwards; and when the piezoelectric actuator 54 drives the torque lever 52 to move upwards, the nano probe 51 at the other end of the torque lever 52 is indented into the natural gas hydrate sample, and the piezoelectric actuator 54 records an indentation depth of the nano probe and a force during the indentation process.

Figure 1:
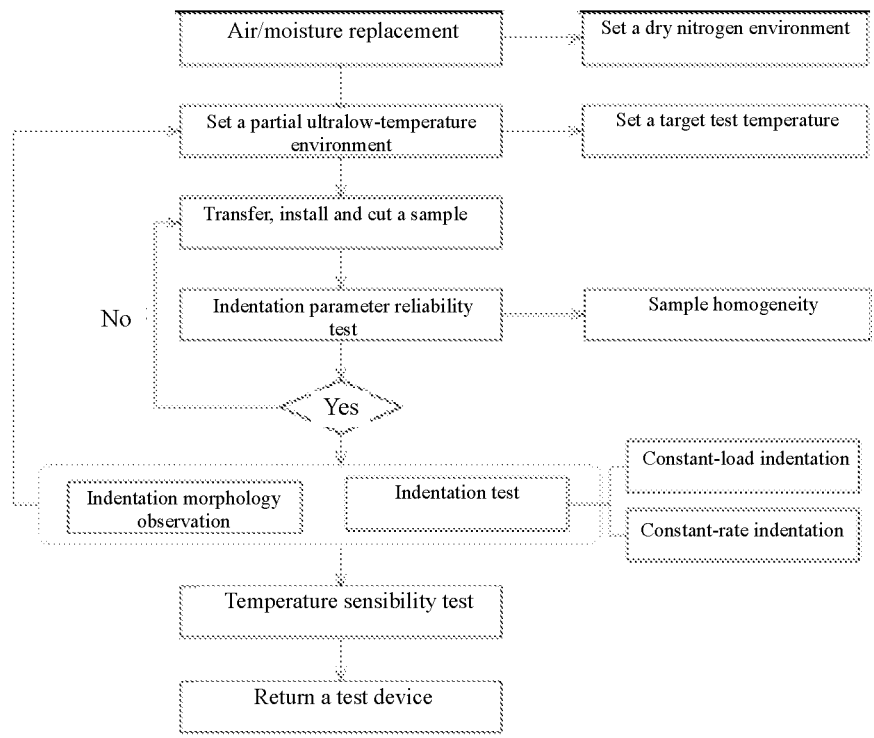
FIG. 1 is a schematic flow diagram of a nanoindentation test method according to one embodiment of the invention.
Figure 3:
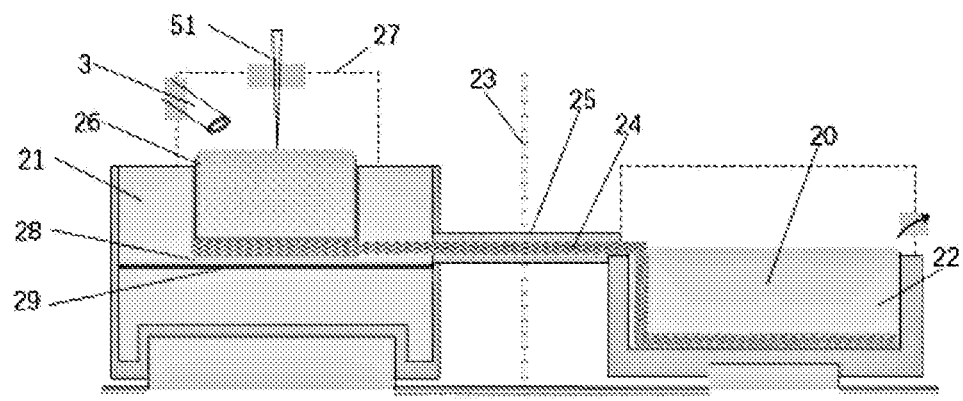
FIG. 3 is a schematic structural diagram of a sample stand according to one embodiment of the invention.

As shown in FIG. 3, the sample stand 2 comprises two chambers which are a sample cell mounting chamber 21 and a liquid nitrogen containing chamber 22 respectively, the liquid nitrogen containing chamber 22 is used for containing liquid nitrogen 20, the sample cell mounting chamber 21 is used for mounting and fixing a sample cell 26, the two chambers are not in direct contact and isolated by means of a heat insulation plate 23 and connected by means of a heat-conduction copper sheet 24, the sample cell mounting chamber 21 is provided with a semi-closed transparent isolation hood 27, the liquid nitrogen containing chamber 22 is also provided with a transparent isolation hood, and a low temperature in the liquid nitrogen containing chamber 22 is conducted to the sample cell 26 by the heat-conduction copper sheet 24 to cool the sample cell 26. A temperature probe 28 and an electromagnetic heating pad 29 are arranged at the bottom of the sample cell mounting chamber 21; and in a case where the temperature of the bottom of the sample cell mounting chamber 21 falls below a set temperature under the action of the temperature of the liquid nitrogen conducted by the heat-conduction copper sheet 24, the electromagnetic heating pad 29 is started automatically to heat the sample cell 26 to maintain the temperature of the bottom of the sample cell 26 constant. The sample cell mounting chamber 21 and the liquid nitrogen containing chamber 22 are isolated, such that a silent environment in the sample cell mounting chamber 21 can be maintained to improve the test stability of the nanoindenter. As shown in FIG. 1, a method for testing nanomechanical properties of natural gas hydrate samples comprises:

Step A, a dry pure nitrogen environment and a partial ultralow-temperature liquid nitrogen test condition are constructed:

Step A1, a pure nitrogen test environment for transferring the hydrate sample is constructed in the glovebox, and a micro-positive pressure state in the glovebox is maintained;

A liquid nitrogen tank containing the natural gas hydrate sample is placed in the glovebox in advance, then the glovebox is closed, hardware parts of the micro-nano test module are installed in the closed glovebox, nitrogen is quickly injected from one side of the glovebox, and air is discharged from the other side of the glovebox; after nitrogen is injected quickly for a period of time, an air discharge valve is closed, the fan in the glovebox is started to stir the gas flow in the glovebox to allow the gas flow to flow sufficiently, nitrogen is injected continuously, and when the nitrogen in the glovebox reaches a micro-positive pressure (such as 0.1 MPa), the nitrogen is released quickly. This step is repeated 2-3 times to quickly release and clean air and moisture in the glovebox 1 to guarantee the pure nitrogen environment, and the micro-positive pressure state in the glove box is maintained during the whole step.

Considering that the natural gas hydrate sample must be preserved in liquid nitrogen under normal pressure because the natural gas hydrate sample will be quickly decomposed once leaving the liquid nitrogen environment and heat is absorbed during decomposition to form on the surface of the hydrate an ice film, the mechanical property of which is essentially different from that of the hydrate, the pure nitrogen test environment is created in the glovebox to prevent the hydrate sample from being in contact with air and moisture when the hydrate sample is transferred and tested, so as to guarantee the test accuracy, in this embodiment. Compared with a traditional process that nitrogen is injected after vacuumizing, this step can prevent a negative pressure or a vacuumizing process of attached sensors of the nanoindenter, thus preventing vibrations or damage to the sensors caused by the vacuumizing process.

Step A2, a partial ultralow-temperature environment of the sample stand 2 and the milling tool is set:

Liquid nitrogen is injected into the sample stand 2 in the glovebox 1 to cool the sample stand 2 and the milling tool partially, and the sample stand 2 is in close contact with the milling tool, such that the temperature of the milling tool and the temperature of the sample stand are consistent; and when it is monitored that the temperature of the sample stand falls below a set temperature (such as −150° C.), a heating module (the electromagnetic heating pad 29) at the bottom of the sample stand 2 is started to maintain the sample stand at the set temperature. When the temperature of the sample stand remains stable under the combined action of the heating module at the bottom of the sample stand 2 and liquid nitrogen cooling, the sample is transferred and installed.

It should be noted that in this step, the sample stand and the milling tool should be synchronously cooled by a same liquid nitrogen supply system; otherwise, the temperature of the sample stand and the temperature of the milling tool are inconsistent, and when the sample is cut, the temperature of the surface of the sample will be inconsistent with the temperature of the sample stand and cannot be used for analyzing the corresponding relationship between indentation test data and temperature.

Compared with traditional cooling and temperature control methods, the dry pure nitrogen environment and the partial ultralow-temperature liquid nitrogen test condition are constructed in Step A1 and Step A2, thus avoiding a waste of liquid nitrogen caused by cooling the interior of the whole glovebox with liquid nitrogen; and the liquid nitrogen only cools the sample stand and the milling tool, thus avoiding a performance degradation of the probe of the nanoindenter under an ultralow-temperature condition and guaranteeing the accuracy of subsequent test results.

Step B, the sample is transferred, installed and cut:
The natural gas hydrate sample is taken out of the liquid nitrogen tank and manually fixed on the sample strand of the nanoindenter in the dry nitrogen environment, and the milling tool is driven to cut the surface of the natural gas hydrate sample to form a relatively flat surface on an upper surface of the natural gas hydrate sample. In this step, because the natural gas hydrate sample is very brittle, the natural gas hydrate sample needs to be scrapped repeatedly by a thickness not greater than the thickness of the milling tool each time during the cutting process.

Figure 4:
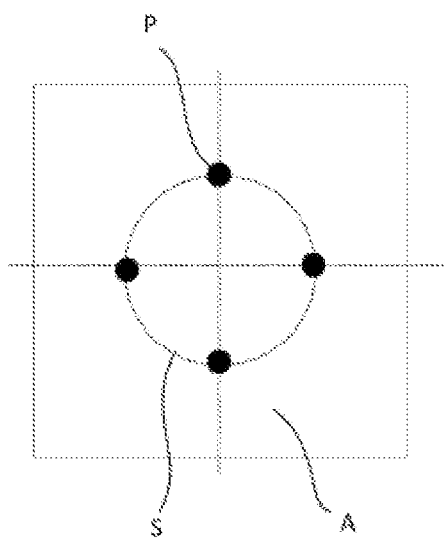
FIG. 4 is a schematic diagram of selected initial indentation points according to one embodiment of the invention.

Step C, indentation test
Step C1, indentation parameter reliability testing;
A main microscope system (located right above the sample stand, not shown in the FIGS, and mainly used for selecting indentation points in an experiment) is used for selecting initial indentation points for indenting the nano probe on the surface of the sample, 3-5 initial indentation points are selected preferably and should be uniformly distributed on a circle S taking a center of the flat surface of the hydrate sample as a center and having a radius being 100 times a diameter of the nano probe. As shown in FIG. 4, A is the natural gas hydrate sample, P is the initial indentation point, and S is the circle where the initial indentation points are located; and after the initial indentation points are selected, the nano probe is indented into the hydrate sample at a fixed set load (such as 0.1 mN), an indentation amount and the load are recorded in real time during the indentation process of the nano probe, and a displacement-load curve is plotted. The nano probe is withdrawn, and a displacement-load curve is recorded during the withdrawing process. All the initial indentation points are sequentially tested in this way, all displacement-load curves are plotted in a same coordinate system; and if the displacement-load curves of all the initial indentation points have a high degree of overlap, it indicates that the homogeneity of the hydrate sample and the stability of the nano probe are optimal and an indentation test result is reliable.

Otherwise, Step B is performed again to cut the surface of the sample to obtain a new flat surface, and initial indentation points are selected again to repeat the above step.

Figure 5:
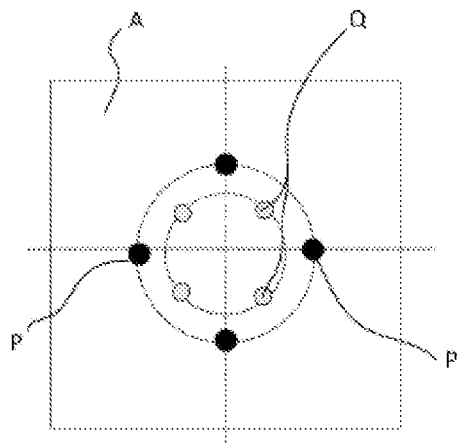
FIG. 5 is a schematic diagram of selected test points according to one embodiment of the invention.

Step C2, indentation testing: the indentation load and the indentation point are changed;
In this step, the indentation load is set according to actual test requirements basically by way of sequentially increasing or decreasing, in the form of an arithmetic progression, the load that is set during the indentation parameter reliability testing; test indentation points are located on a circle having a same center as the circle where the initial indentation points P are located and a radius being 40-60 times the diameter of the nano probe, 3-5 test indentation points Q are selected preferably, and the test indentation points Q are uniformly distributed on the selected circle, as shown in FIG. 5. By means of this step, a variation pattern of a nanoindentation curve of the same hydrate sample with the indentation load under the same temperature condition can be obtained to analyze residual strength and other characteristic parameters of the natural gas hydrate sample under different loading conditions. It should be particularly noted that the constant-load indentation process in this step can be changed into a constant-rate indentation process.

Step C3, temperature sensitivity testing: the hydrate sample is changed according to Step B, the temperature of the sample stand is changed, and Step C1 and Step C2 are repeated to obtain nanoindentation response characteristics of the natural gas hydrate sample under different temperature conditions.

Step C4, indentation form observation: when Step C2 and Step C3 are performed, a failure form of the surface of the natural gas hydrate sample during the indentation process of the nano probe and a residual indentation form of the surface of the sample after the nano probe is withdrawn are observed by means of the microscope system, and results recorded under different indentation conditions are compared with nanoindentation response characteristics of the hydrate sample under different indentation conditions to analyze indentation response characteristics of the natural gas hydrate sample.

Step D, returning of the test device: after the indentation test of the natural gas hydrate sample is completed, the positive pressure in the glovebox is released slowly, the micro-nano test module is operated to return and clean the nano probe, and after the entire nanoindentation system is dried, the liquid nitrogen tank containing the hydrate sample is taken out, and the low-temperature glovebox is maintained in a dry nitrogen-rich environment for a long time.

The above embodiments are merely preferred ones of the invention, and are not intended to limit other forms of the invention. Any skilled in the art can make transformations or modifications based on the technical contents disclosed above to obtain equivalent embodiments applied to other fields, and any simple amendments and equivalent transformations and modifications made to the above embodiments according to the technical essence of the invention without departing from the technical contents of the invention should still fall within the protection scope of the technical solution of the invention.

What is claimed is:
1. A method for testing nanomechanical properties of natural gas hydrate samples, wherein a natural gas hydrate sample in an ultralow-temperature environment is measured by means of a nanoindentation system, wherein the nanoindentation system comprises:
   a glovebox and a sample stand,
   a microscope system,
   a nano positioning stage,
   a micro-nano test module and a control cabinet, wherein the micro-nano test module and the control cabinet are mounted in the glovebox,
   a milling tool, wherein the milling tool is in close contact with the sample stand and used for cutting a surface of the sample being arranged on a side of the sample stand; and wherein
   the nano positioning stage drives the micro-nano test module to perform indentation on the hydrate sample on a side of the sample stand;
   the micro-nano test module records a displacement and force when a nano probe is indented into the hydrate sample and transmits the displacement and force to the control cabinet in real time; wherein, the method for testing nanomechanical properties of natural gas hydrate samples comprises:
   step (A), constructing a dry pure nitrogen environment and a partial ultralow-temperature liquid nitrogen test condition by placing a liquid nitrogen tank containing the natural gas hydrate sample in the glovebox in advance, constructing a pure nitrogen test environment, for transferring the hydrate sample, in the glovebox, and maintaining a micro-positive pressure state in the glovebox; then, injecting nitrogen into the sample stand to cool the sample stand and the milling tool, and when temperatures of the sample stand and the milling tool reach a set temperature, controlling a heating system at a bottom of the sample stand to maintain the temperatures of the sample stand and the milling tool at the set temperature;

step (B), in the dry nitrogen environment, transferring and installing the hydrate sample on the sample stand, and driving the milling tool to cut the surface of the natural gas hydrate sample to form a flat surface on an upper surface of the natural gas hydrate sample;

step (C), performing an indentation test by:

step (C1), testing indentation parameter reliability by selecting on the surface of the hydrate sample an initial indentation point for indenting the nano probe, indenting the nano probe into the hydrate sample at a fixed set load, recording in real time an indentation amount and the load during the indentation process of the nano probe, and plotting a displacement-load curve; withdrawing the nano probe, and recording a displacement-load curve during the withdrawing process; sequentially testing all initial indentation points in this way, and plotting all displacement-load curves in a same coordinate system; if the displacement-load curves of all the initial indentation points have a high degree of overlap, indicating that homogeneity of the hydrate sample and stability of the nano probe are optimal and an indentation test result is reliable;

step (C2), testing indentation by changing the indentation load and the indentation point to obtain a variation pattern of a nanoindentation curve of the same hydrate sample with the indentation load under a same temperature condition to analyze residual strength and other characteristic parameters of the natural gas hydrate sample under different loading conditions; and step (C3), testing temperature sensitivity by changing the hydrate sample according to Step B, changing the temperature of the sample stand, and repeating step (C1) and step (C2) to obtain nanoindentation response characteristics of the hydrate sample under different temperature conditions; and step (D), after the indentation test is completed, slowly releasing the positive pressure in the glovebox, operating the micro-nano test module to return and clean the nano probe, and after the entire nanoindentation system is dried, taking out the liquid nitrogen tank containing the hydrate sample, and maintaining the low-temperature glovebox in a dry nitrogen-rich environment.

2. The method for testing nanomechanical properties of natural gas hydrates according to claim 1, wherein in step (C), when step (C2) and step (C3) are performed, a failure form of the surface of the natural gas hydrate sample during the indentation process of the nano probe and a residual indentation form of the surface of the sample after the nano probe is withdrawn are observed by means of the microscope system, and results recorded under different indentation conditions are compared with nanoindentation response characteristics of the hydrate sample under different indentation conditions to analyze indentation response characteristics of the natural gas hydrate sample.

3. The method for testing nanomechanical properties of natural gas hydrates according to claim 1, wherein in step (C), during indentation parameter reliability testing, uniformly distributing the initial indentation points on a circle taking a center of the flat surface of the hydrate sample as a center and having a radius being 100 times a diameter of the nano probe, and the number of the initial indentation points is 3-5.

4. The method for testing nanomechanical properties of natural gas hydrates according to claim 1, wherein in step (C), during indentation testing, setting the indentation load according to actual test requirements by way of sequentially increasing or decreasing an arithmetic progression, the load that is set during indentation parameter reliability testing, selected indentation points are located on a circle having a same center as a circle where the initial indentation points are located and a radius being 40-60 times a diameter of the nano probe, test points are uniformly distributed on a selected circle, and the number of the test points is 3-5.

5. The method for testing nanomechanical properties of natural gas hydrates according to claim 1, wherein in step (A), during the construction of the pure nitrogen environment, quickly injecting nitrogen from one side of the glovebox, discharging air from the other side of the glovebox, and sufficiently stirring a gas flow in the glovebox when the nitrogen is injected into the glovebox; continuously injecting the nitrogen into the glovebox and quickly releasing when the nitrogen in the glovebox reaches a micro-positive pressure; and repeating the operation at least twice to quickly release and clean air and moisture in the glovebox to guarantee the pure nitrogen environment, and maintaining the micro-positive pressure state in the glove box during the whole indentation test.

6. The method for testing nanomechanical properties of natural gas hydrates according to claim 1, wherein the sample stand comprises a sample cell mounting chamber and a liquid nitrogen containing chamber, the sample cell mounting chamber and the liquid nitrogen containing chamber are isolated by means of a heat insulation plate and connected by means of a heat-conduction copper sheet, and a heating module is arranged at a bottom of the sample cell mounting chamber; in step (A), during construction of a partial ultralow-temperature environment, injecting liquid nitrogen into the liquid nitrogen containing chamber of the sample stand in the glovebox to cool the sample stand and the milling tool partially, maintaining the sample stand at the set temperature by means of the heating module; and when the temperature of the sample stand remains stable under the combined action of the heating module at the bottom of the sample cell mounting chamber and liquid nitrogen cooling, the sample is transferred and installed.

7. The method for testing nanomechanical properties of natural gas hydrates according to claim 1, wherein in step (B), during the cutting process, repeatedly scraping the surface of the hydrate sample by a thickness not greater than a thickness of the milling tool each time.

* * * * *